United States Patent [19]
Wang

[11] Patent Number: 5,778,766
[45] Date of Patent: Jul. 14, 1998

[54] AUTOMATIC BREADMAKER HAVING TOASTER OVEN FUNCTION

[76] Inventor: Donglei Wang, Vesta Industrial Building, Light Industrial North Road, Xiangzhou Industrial Area, Zhuhai City, Guangdong Province, China

[21] Appl. No.: 908,139

[22] Filed: Aug. 6, 1997

[30] Foreign Application Priority Data

Sep. 9, 1996 [CN] China ................ 96 2 17747.4

[51] Int. Cl.$^6$ .............. A21B 1/00; A21D 8/00; A47J 27/00; A47J 37/01
[52] U.S. Cl. .............. 99/326; 99/331; 99/339; 99/340; 99/348; 99/419; 99/421 H; 99/476; 219/400
[58] Field of Search .............. 99/348, 339, 340, 99/325–328, 331–335, 467, 468, 476, 483, 484, 486, 419–421 H; 366/69, 96–98, 144–146, 149, 341, 314, 601; 426/504, 512; 219/400, 402, 391; 126/21 A; 364/400

[56] References Cited

U.S. PATENT DOCUMENTS

| | | |
|---|---|---|
| 4,845,327 | 7/1989 | Iwabuchi et al. ........... 99/451 X |
| 5,392,695 | 2/1995 | Junkel ........................ 99/328 |
| 5,463,937 | 11/1995 | Belongia et al. ............ 99/348 |
| 5,493,955 | 2/1996 | Belongia et al. ............ 99/348 |
| 5,568,764 | 10/1996 | Belongia et al. .......... 99/348 X |
| 5,665,410 | 9/1997 | Turchany et al. ........ 99/327 X |
| 5,704,277 | 1/1998 | Yung ........................ 99/327 |

*Primary Examiner*—Timothy F. Simone
*Attorney, Agent, or Firm*—Chen, Lin, Li and Jiang, LLP

[57] ABSTRACT

The present invention relates to an automatic breadmaker having toaster oven function. The breadmaker includes a housing having a base member, a top, a rear wall, and two lateral side walls which form an oven cavity with a front opening for receiving a bread pan containing a kneading member and dough, and wherein the front edges of the lateral side walls are slopped downward and forward for facilitating the installation and removal of the bread pan; a front access door hinged to the housing for selectively closing the front opening of the oven cavity; a top heating element mounted on the housing and disposed inside the oven cavity and adjacent to the top thereof; a bottom heating element mounted on the housing and disposed inside the oven cavity and adjacent to the bottom thereof; means for driving the kneading member to mix the dough; and means for control the operation of the driving means and the top and bottom heating members.

19 Claims, 5 Drawing Sheets

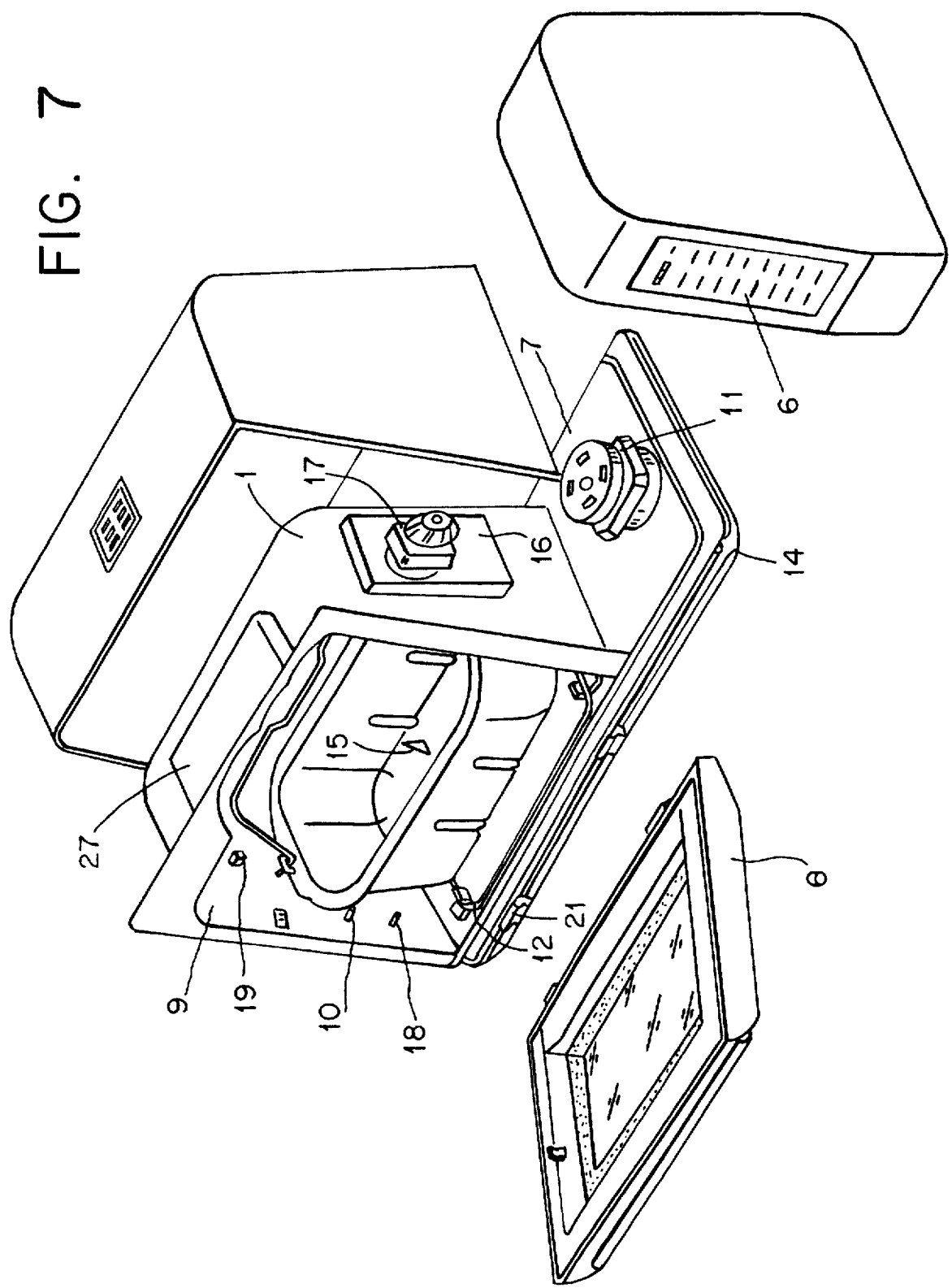

AUTOMATIC BREADMAKER HAVING TOASTER OVEN FUNCTION

BACKGROUND OF THE INVENTION

1. Field of the Invention

The present invention relates generally to a breadmaker and a toaster oven. More particularly, the present invention relates to an automatic breadmaker having the function of a toaster oven, which is able to provide completely and satisfactorily all the functions of a breadmaker and a toaster oven.

2. Description of the Prior Art

Domestic automatic breadmakers and domestic toaster ovens are both widely popular household kitchen appliances. However, with the increase of household kitchen appliances and in view of the limited space a kitchen can provide, it would be desirable to have a kind of domestic appliance that combines the function of a breadmaker with that of a toaster oven. Currently all the breadmakers on the market provide bread-making function only. Ordinary breadmakers cannot provide the function of a toaster oven because of their structural design limitation. For example, U.S. Pat. No. 5,493,955 discloses a device, which by definition is merely a breadmaker. Furthermore, because of its "laterally opening wide access door" design, it is difficult to install a standard heating element near the top of that breadmaker. Therefore, it is difficult for that breadmaker to provide the function of a toaster oven.

SUMMARY OF THE INVENTION

Therefore, it is an object of the present invention to provide a breadmaker that has the function of a toaster oven.

Another object of the present invention is to provide an automatic breadmaker that has the function of a toaster oven.

Another object of the present invention is to provide an automatic breadmaker with a brand new structural design. The automatic breadmaker with such a design includes a predetermined sloping front edge surface and a bottom hinged front access door with appropriate thickness. Such a design provides sufficient space to install not only a set of heating elements adjacent to or near the top of the breadmaker, but also a set of heating elements adjacent to or near the bottom of the breadmaker. Such a design also provides sufficient lateral space to install an electric motor used for rotating a chicken, or a hot-air blower on the lateral side portion of the breadmaker. Meanwhile, such a design ensures that a bread pan can be easily removed from the front of the breadmaker, thereby effectively reducing the height of the breadmaker and overcoming the defect associated with the "top hinged access door" type breadmakers which normally cannot be placed in a kitchen cabinet.

Another object of the present invention is to provide an automatic breadmaker that uses a computerized controller to control the respective heating time of the two sets of heating elements to ensures that a loaf of bread would be baked more evenly. As a result, such a breadmaker overcomes the problem associated with the bread produced by an ordinary breadmaker that the bottom of the finished bread is dark and thick-skinned while the top of the bread is light-colored. Such a problem occurs because an ordinary breadmaker produces heat only from its bottom by a set of bottom heating elements. Meanwhile, regular power distribution between the two sets of heating elements ensures that when the breadmaker is used as a toaster oven it can, based on different food, adopt different computerized heating or cooking program to heat or cook the food thereby rendering the finished food more delicious.

Still another object of the present invention is to provide an automatic breadmaker having toaster oven function, which is characterized by ease of use, simplicity of construction, and which can be manufactured and sold at a relatively low price.

Further objects and advantages are to provide improved elements and arrangements thereof in an automatic breadmaker having toaster oven function for the purposes described, which is dependable, economical, durable and fully effective in accomplishing its intended purposes.

These improvements, objects and advantages will become more apparent from the following description and drawings.

The automatic breadmaker of the present invention includes a main body having a front access door; a computerized control panel; a bread pan; oven racks; electric motors; and other essential components. The main body includes a sloping housing and a front access door with appropriate thickness. The sloping housing includes a substantially vertical rear wall and a front edge surface that is sloped downward and forward. The slope of the front edge surface relative to a vertical plane is approximately between 7 degrees to 35 degrees. The front access door has a thickness of approximately 20 mm to 60 mm, and is hinged to the housing along the sloping front edge surface. The front access door has formed a recessed portion on its back. When used in conjunction with the housing, the front access door closely receives and covers the bread pan. The front access door could be bottom hinged to the housing along the horizontal bottom front edge of the housing and pivotable about a horizontal axis; or it could be side hinged to the housing along the sloping front side edge of the housing and pivotable about an oblique or sloped axis.

The housing further includes a base member and an interior wall member which is affixed to the base member. An electric kneading motor and a heating element or heating wire are mounted on the top of the base member. A conventional belt-pulley-driving assembly is mounted on the bottom of the base member, and is operable to transmit a kneading force to a kneading member positioned inside the bread pan to mix dough in the bread pan. A hot-air blower or an electric rotating motor used for rotating a chicken, and a plurality of dowel-like support members used for supporting oven racks are mounted on the interior wall member. The top portion and the bottom portion of the housing each has a set of heating elements. The two sets of heating elements ensure that a loaf of bread or other article of food such as a chicken will be baked or cooked simultaneously from the top and bottom of the housing. The computerized control panel including a computerized controller is mounted on the base member and adjacent to the housing. The automatic breadmaker further includes an oven tray, an oven wire rack, a rotary oven rack, and other accessories.

The improved automatic breadmaker in accordance with the present invention has a main body that is sloped downward and forward. One difference between this breadmaker and ordinary breadmakers is that the front access door of this breadmaker has a thickness between 20 mm to 60 mm. The combination of the sloping main body and the thick front access door facilitates the removal of the bread pan when the front access door is open.

The front access door of the automatic breadmaker of the present invention has a large viewing window, which allows a user to observe the baking or cooking progress of a loaf of bread or other article of food. Meanwhile, the combination of the window having a thickness of 3 mm, the front access door having a thickness of at least 30 mm, and the sloping main body design provides a sufficient space to expose part of the bread pan when the front access door is open, thereby facilitating the screw-in installation or removal of the bread pan.

The improved automatic breadmaker has a set of top heating elements and a set of bottom heating elements, as opposed to only a set of bottom heating elements in ordinary breadmakers. The two sets of heating elements are operable to work alone or together under the control of the computerized controller to bake or cook a loaf of bread or other article of food more evenly. The adoption of two sets of heating elements is new in automatic breadmaker design, which ensures that the finished bread would be baked evenly and have a soft texture. This overcomes the problem that the bottom of a finished bread is dark and thick-skinned while the top of the bread is light and thin-skinned when the bread is baked only from bottom by a set of bottom heating elements.

BRIEF DESCRIPTION OF THE DRAWINGS

FIG. 7 is another perspective and partially exploded view of the automatic breadmaker of the present invention, which illustrates the electric rotating motor.

DETAILED DESCRIPTION OF THE PREFERRED EMBODIMENT

Figure 1:
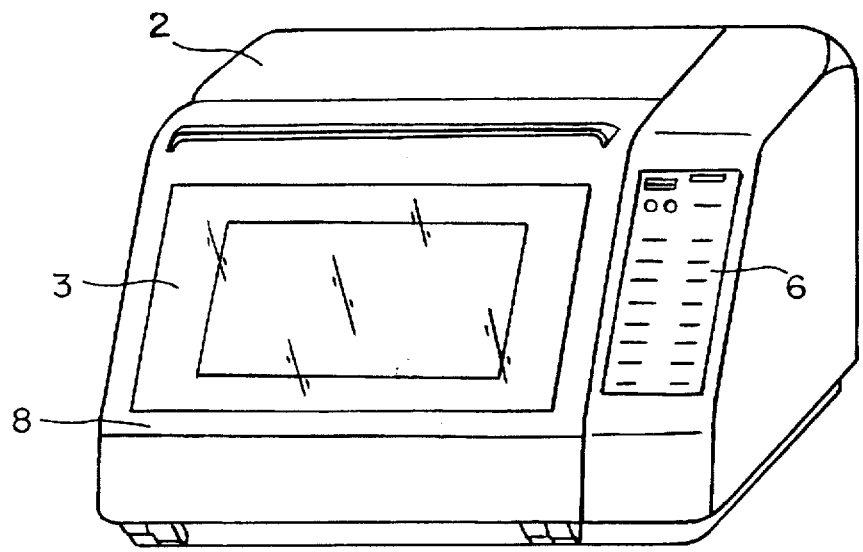
FIG. 1 is a top, front and right side perspective view of the automatic breadmaker of the present invention shown in a typical operative configuration.
Figure 2:
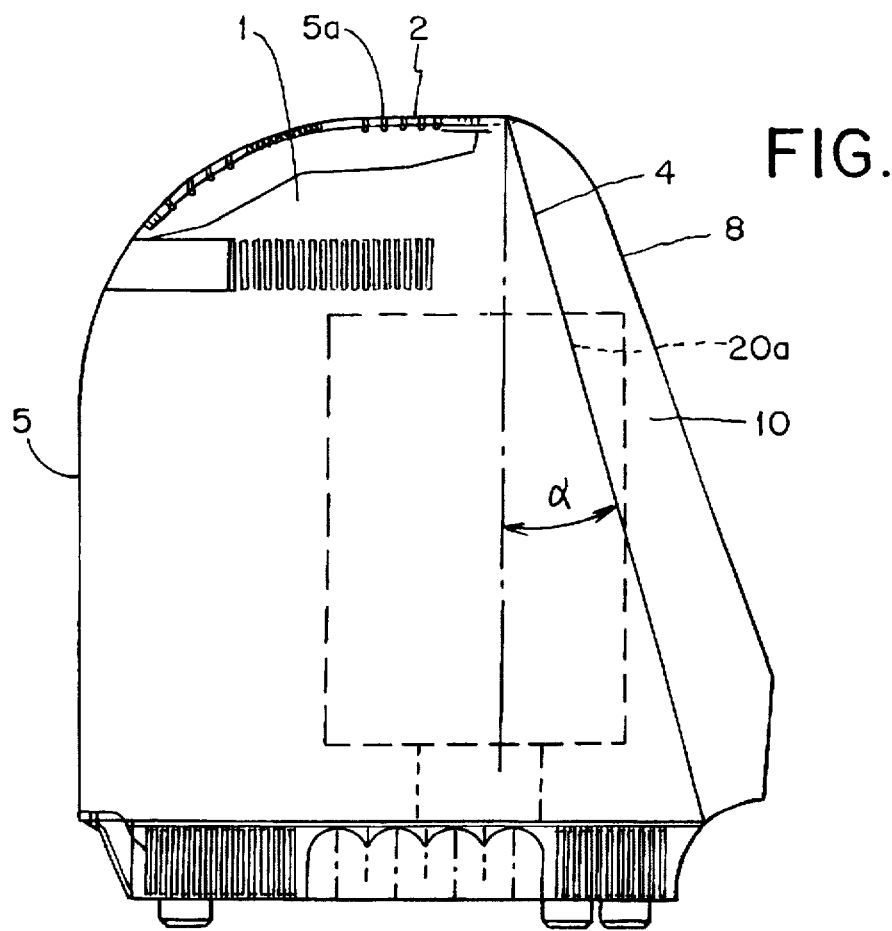
FIG. 2 is a left side elevation view of the automatic breadmaker of the present invention.
Figure 3:
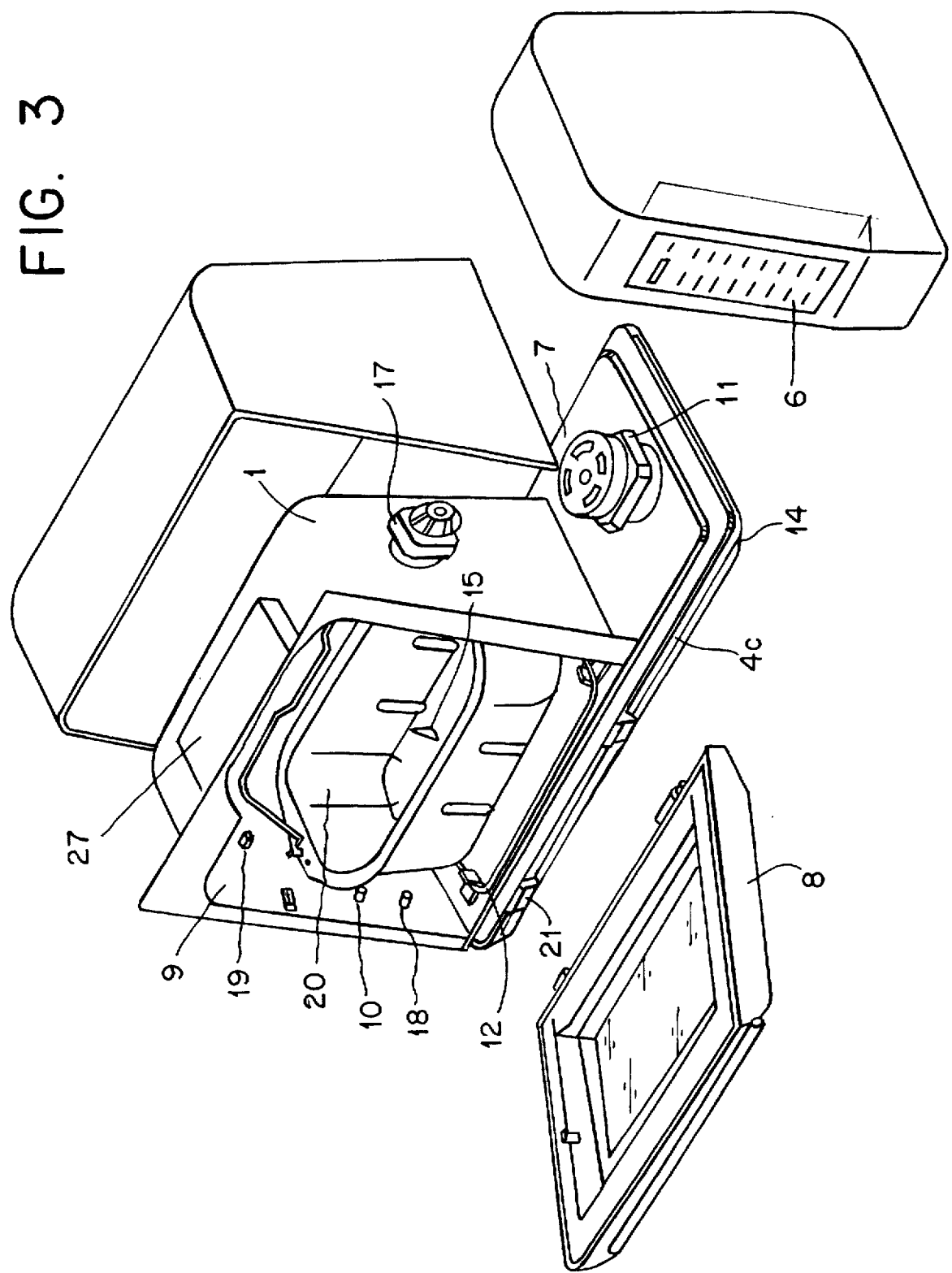
FIG. 3 is a perspective and partially exploded view of the automatic breadmaker of the present invention, which illustrates the internal structure of the breadmaker.

As shown in FIGS. 1 and 2, the automatic breadmaker of the present invention includes a main body 2 with a flat front access door 8; a computerized control panel 6 having a computerized controller; a bread pan 10; oven racks; electric motors; and other essential components. The main body 2 includes a housing 1 that is sloped downward and forward. The front access door 8 has appropriate, predetermined thickness. The sloping housing 1 includes a substantially vertical rear wall 5 and a front edge surface 4 that is sloped downward and forward. The housing 1 further includes a top 5a, two spaced and substantially vertical lateral side walls 5b. The front edges 4b of the lateral side walls 5b, which are part of the sloping front edge surface 4, are sloped downward and forward. The housing 1 defines an oven cavity 20 with a sloping front opening 20a for receiving a bread pan in a predetermined position inside the oven cavity 20. The slope a of the front edge surface 4 and/or the sloping front opening 20a relative to a vertical plane is approximately between 7 degrees to 35 degrees, preferably 18 degrees. As best shown in FIG. 2, when the bread pan is in its predetermined position, because of the sloping front opening 20a part of the bread pan rim is disposed outside the oven cavity 20 thereby facilitating the installation and removal of the bread pan. The front access door 8 is hinged to the housing 1 along the sloping front edge surface 4 for selectively closing the front opening 20a of the oven cavity 20. The thickness of the front access door 8 (meaning the thickness of the peripheral doorframe) is approximately between 20 mm to 60 mm, preferably 35 mm. The central portion of the front access door 8 is provided with a large viewing window 3 with a thickness of approximately 3 mm. The window 3 allows a user to observe the baking or cooking process of a loaf of bread or other article of food when the front access door 8 is closed. As should be understood, because of the thickness difference between the front access door 8 and the window 3, the front access door 8 has formed a recessed portion of sufficient depth on its back. Therefore, as best illustrated in FIG. 2, the front access door 8, when coupled with the housing 1, closely covers the bread pan 10. More particularly, the recessed portion has such a depth that when the front access door 8 closes the front opening 20a the door 8 is able to closely cover the part of bread pan rim that is disposed outside the oven cavity 20. The sloping computerized control panel 6 is in conformity with ergonomic designs. The compartment of the computerized control panel 6 contains or covers an electric kneading motor, a hot-air blower, or an electric rotating motor used for rotating a chicken, the computerized controller including various control circuits, and the like essential components.

As shown in FIGS. 3 and 5 through 7, the housing 1 further includes a base member 7, and an interior wall member 9 affixed to the base member 7. An electric kneading motor 11 used for generating a kneading force, and a bottom heating element or a set of bottom heating elements 12 are mounted on the top of the base member 7. The bottom heating element 12 is disposed inside the oven cavity 20 and adjacent to the bottom thereof. A conventional belt-pulley-driving assembly 13 used for transmitting the kneading force is mounted on the bottom of the base member 7. A cover 14 encloses the bottom of the base member 7. The belt-pulley-driving assembly 13, driven by the electric kneading motor 11, rotates a kneading member 15 positioned inside the bread pan 10 to mix dough in the bread pan 10. The interior surface of the interior wall member 9 is provided with a layer of non-stick material. As discussed above, the interior wall member 9 is affixed to the base member 7. A hot-air blower 16 used for circulating the air inside the housing 1 when the front access door 8 is closed, or an electric rotating motor 17 used for rotating a chicken to be cooked is mounted on the lateral sides of the interior wall member 9. Furthermore, a plurality of dowel-like or peg-like support members 18 and 19 used for supporting oven racks are mounted on the lateral sides of the interior wall member 9. A top heating element or a set of top heating elements 27 is mounted to the housing 1 and disposed inside the oven cavity 20 and adjacent to the top thereof. The top and bottom heating elements or the sets of top and bottom heating elements ensure that a loaf of bread or other article of food such as a chicken will be baked or cooked simutaneouly from the top and bottom of the housing 1. The computerized control panel 6 is installed adjacent to the housing 1, and controls the operation of the electric kneading motor 11 and the electric rotating motor 17 as well as the top and bottom heating elements or the sets of top and bottom heating elements 12 and 27. The computerized control panel 6 has many pre-set touch pads and other control pads, which enable the breadmaker to use different power levels at different times to heat or bake an article of food based on the nature of that food and the different stage of the baking or cooking progress so that the finished food is more delicious. The front access door 8 could be bottom hinged to the base member 7 of the housing 1 along the horizontal bottom front edge 4c thereof and pivotable about a horizontal axis 21; or it could be side hinged to the lateral side wall 5b of the housing 1 along the sloping front edge 4b thereof and pivotable about an oblique or sloped axis 22. When the automatic breadmaker is merely used as a breadmaker, the bread pan 10 is placed inside the oven cavity 20 of the housing 1 in a predetermined position. The bread pan 10 has a screw-in mount, and is releasably screwed onto the base member 7 until it is locked in place. To couple with the screw-in type bread pan 10, the electric kneading motor 11 is irreversible. The two diagonal lines of the bread pan 10 and the kneading member 15 are dimensioned such that even though the electric kneading motor 11 is irreversible, the kneading member 15 is able to mix the dough in the bread pan 10 evenly and thoroughly without leaving any substantial unmixed ingredients around the corners of the bread pan 10. Normally only reversible kneading motors could achieve same result.

Figure 4:
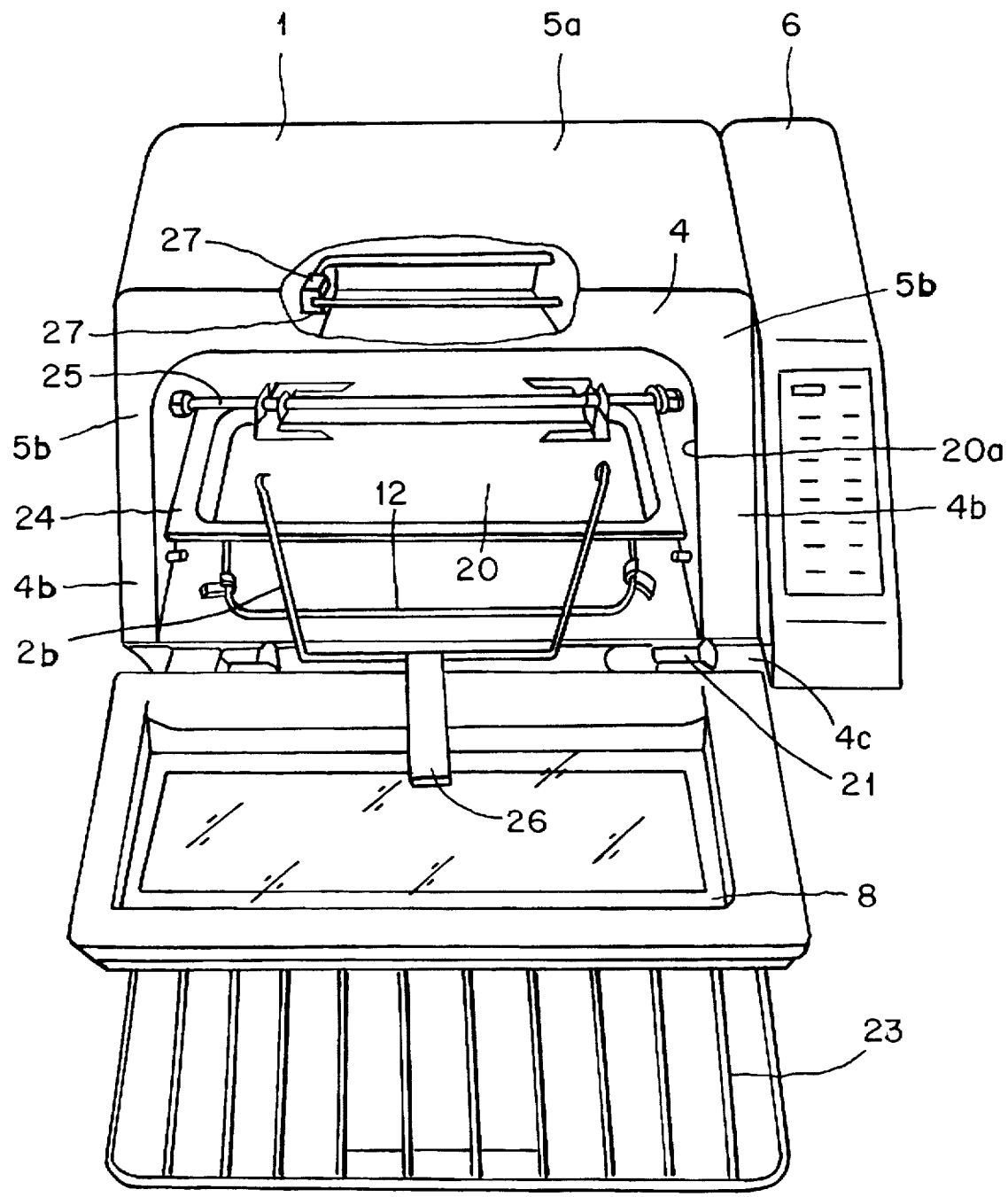
FIG. 4 is a top and front perspective view of the automatic breadmaker of the present invention with the bottom-hinged front access door fully open, which illustrates how the breadmaker is used as a domestic toaster oven.
Figure 5:
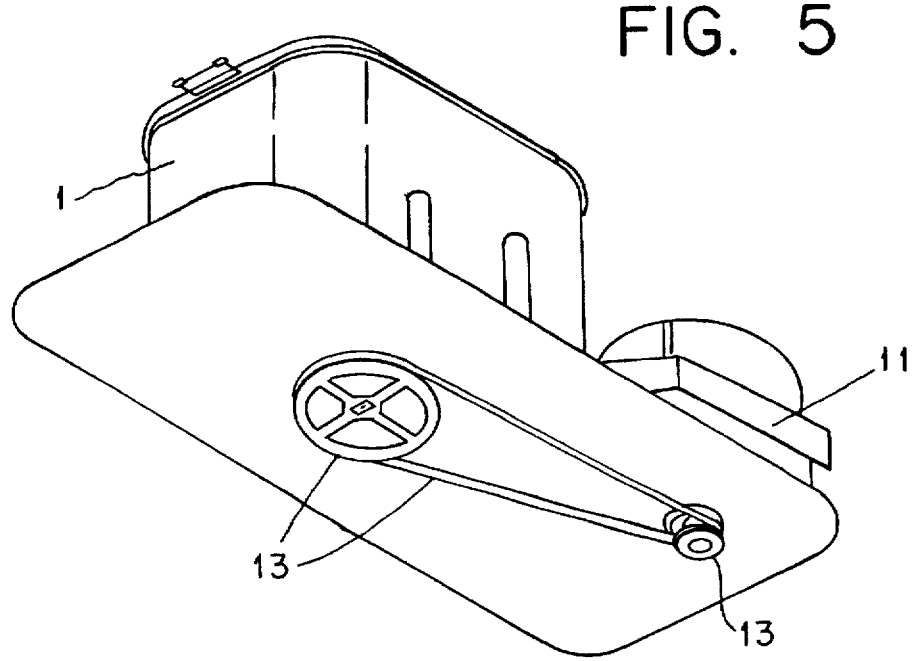
FIG. 5 is a bottom perspective view of the base member and the belt-valley-driving assembly of the automatic breadmaker of the present invention.
Figure 6:
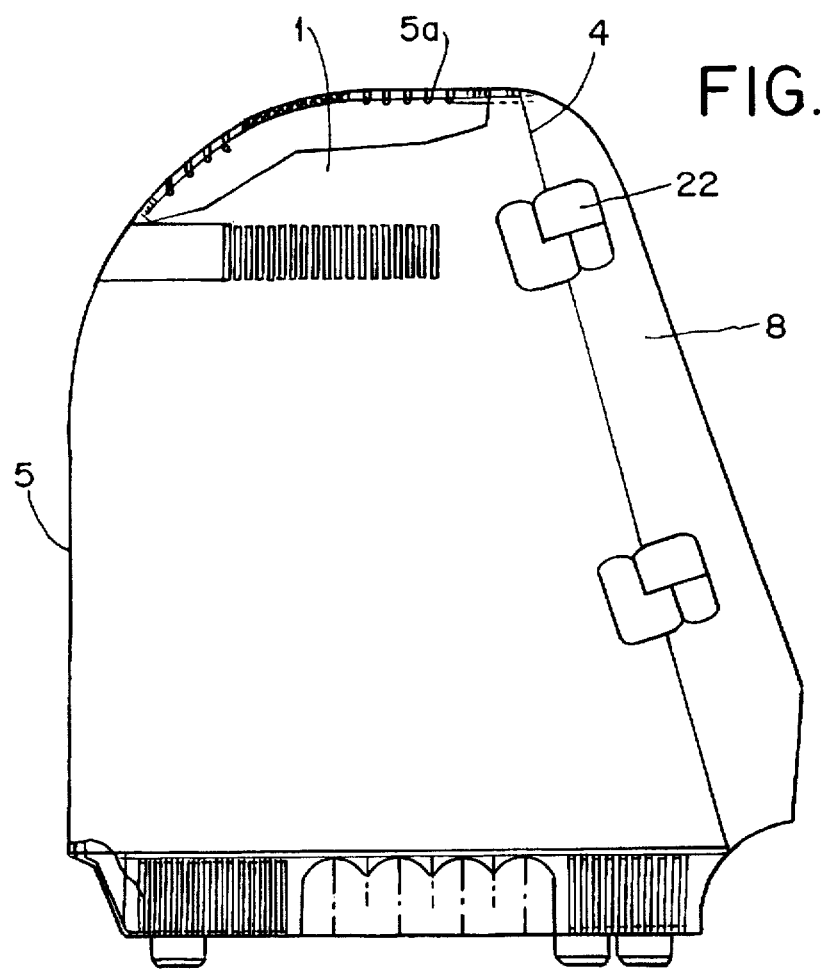
FIG. 6 is another left side elevation view of the automatic breadmaker of the present invention, in which the front access door is side-hinged to the sloping front side edge of the housing.

As shown in FIG. 4, when the automatic breadmaker is merely used as a toaster oven, a user (not shown) first removes the bread pan 10 from the oven cavity 20 of the breadmaker. Then the user places an oven wire rack 23 inside oven cavity 20 of the breadmaker. Then the user places an oven tray 24 and a rotary oven rack 25 on the support members 18 and 19, respectively. In operation, the electric rotating motor 17 rotates the rotary oven rack 25 so that a chicken and the like on the rotary oven rack 25 will be baked or cooked evenly. The oven tray 24 will collect any oil dropping from the chicken. After the operation is finished, the user uses a hand tool 26 to remove the oven tray 24 and other accessories from the oven cavity 20 of the breadmaker.

Although the present invention has been herein shown and described in what is conceived to be the most practical and preferred embodiment, it is recognized that departures may be made therefrom within the scope of the invention which is not to be limited to the illustrated details disclosed.

Having described my invention, what I claim as new and desire to secure by Letters Patent is:

1. A breadmaker comprising:
   a housing having a base member, a top, a rear wall and two lateral side walls, the front edges of the lateral side walls being sloped downward and forward, and wherein the base member, the top, the real wall and the lateral side walls define an oven cavity with a sloping front opening for facilitating the installation and removal of a bread pan;
   a front access door pivotally borne by the housing for selectively closing the front opening;
   a top heating element borne by the housing and disposed inside the oven cavity and adjacent to the top thereof;
   a bottom heating element borne by the housing and disposed inside the oven cavity and adjacent to the bottom thereof; and
   means for controlling the operation of the top and bottom heating elements.

2. A breadmaker as claimed in claim 1, wherein the slope of the front opening relative to a vertical plane is between 7 degrees and 35 degrees.

3. A breadmaker as claimed in claim 2, wherein the slope of the front opening relative to a vertical plane is 18 degrees.

4. An automatic breadmaker having toaster oven function, comprising:
   a housing having a base member, a top, a rear wall, and two lateral side walls, the front edges of the lateral side walls being sloped downward and forward, and wherein the base member, the top, the rear wall and the lateral side walls define an oven cavity with a sloping front opening for receiving a bread pan containing a kneading member and dough, and wherein the slope of the front opening relative to a vertical plane is between 7 degrees and 35 degrees thereby facilitating the installation and removal of the bread pan;
   a flat front door hinged to the housing for selectively closing the front opening of the oven cavity;
   a top heating element mounted on the housing and disposed inside the oven cavity and adjacent to the top thereof;
   a bottom heating element mounted on the housing and disposed inside the oven cavity and adjacent to the bottom thereof;
   means for driving the kneading member to mix the dough; and
   means for control the operation of the driving means and the top and bottom heating members.

5. An automatic breadmaker as claimed in claim 4, wherein the slope of the front opening relative to a vertical plane is 18 degrees.

6. An automatic breadmaker as claimed in claim 4, wherein the driving means includes an electric kneading motor for generating a kneading force and a belt-valley-driving assembly for transmitting the kneading force to the kneading member.

7. An automatic breadmaker as claimed in claim 6, which further comprises an electric rotating motor mounted on the housing for rotating an article of food when the breadmaker is used as a toaster oven.

8. An automatic breadmaker as claimed in claim 7, which further comprises a hot-air blower mounted on the housing for circulating the air inside the oven cavity when the front access door closes the front opening of the oven cavity.

9. An automatic breadmaker as claimed in claim 8, which further comprises a plurality of spaced support members borne by the lateral sides of the oven cavity for supporting oven racks when the breadmaker is used as a toaster oven.

10. An automatic breadmaker having toaster oven function, comprising:
    a housing having a base member, a top, a rear wall, and two lateral side walls, the front edges of the lateral side walls being sloped downward and forward, and wherein the base member, the top, the rear wall and the lateral side walls form an oven cavity with a sloping front opening for receiving a bread pan containing a kneading member and dough in a predetermined position inside the oven cavity, and wherein the slope of the front opening relative to a vertical plane is between 7 degrees to 35 degrees so that when the bread pan is in the predetermined position part of the bread pan rim is disposed outside the oven cavity thereby facilitating the installation and removal of the bread pan;
    a flat front access door having a thickness between 20 mm to 60 mm and hinged to the housing for selectively closing the front opening of the oven cavity and, and wherein the back of the front access door has a recessed portion of sufficient depth for closely covering the part of bread pan rim disposed outside the oven cavity when the front door closes the front opening;

a top heating element mounted on the housing and disposed inside the oven cavity and adjacent to the top thereof;

a bottom heating element mounted on the housing and disposed inside the oven cavity and adjacent to the bottom thereof;

an electric kneading motor mounted on the housing for generating a kneading force;

means for transmitting the kneading force to the kneading member to mixing the dough in the bread pan; and a computerized controller for controlling the operation of the top and bottom heating elements and the electric kneading motor.

11. An automatic breadmaker as claimed in claim 10, wherein the front access is provided with a window having a thickness of 3 mm thereby forming the recessed portion.

12. An automatic breadmaker as claimed in claim 11, wherein the thickness of the front access door is 35 mm.

13. An automatic breadmaker as claimed in claim 10, wherein the slope of the front opening relative to a vertical plane is 18 degrees.

14. An automatic breadmaker as claimed in claim 10, which further comprises an electric rotating motor mounted on the housing for rotating an article of food when the breadmaker is used as a toaster oven.

15. An automatic breadmaker as claimed in claim 14, which further comprises a plurality of spaced support members mounted on the lateral sides of the oven cavity for supporting oven racks when the breadmaker is used as a toaster oven.

16. An automatic breadmaker as claimed in claim 15, which further comprises a hot-air blower mounted on the housing for circulating the air inside the oven cavity when the front access door closes the front opening of the oven cavity.

17. An automatic breadmaker as claimed in claim 16, wherein the transmitting means is a belt-valley-driving assembly.

18. An automatic breadmaker as claimed in claim 17, wherein the front access door is hinged to the bottom front edge of the base member of the housing.

19. An automatic breadmaker as claimed in claim 17, wherein the front access door is hinged to the sloping front edge of one lateral side wall of the housing.

* * * * *